United States Patent Office.

MORTIMER WILLIAMS, OF MIDDLETOWN, OHIO.

Letters Patent No. 96,371, dated November 2, 1869.

IMPROVED COMPOUND FOR THE CURE OF CANCER.

The Schedule referred to in these Letters Patent and making part of the same.

*To all whom it may concern:*

Be it known that I, MORTIMER WILLIAMS, of Middletown, in Butler county, Ohio, have discovered a new and useful Composition of Matter for the Cure of Cancers, ulcers, and other sores upon the human body; and I do hereby declare that the following is a full and exact description thereof, and of the manner of applying and using the same.

I prepare my improved remedy by the use of the following-named ingredients, in the proportions as follows, to wit:

I take one ounce of corrosive sublimate; two ounces of the inner coating of red-oak bark; one ounce of the inner coating of sycamore-bark. These three ingredients are to be mixed together in one quart of rain-water, in a suitable bottle, and, as soon as the corrosive sublimate is entirely dissolved, and the bark has imparted its strength to the water, the solution is ready for use.

The application is made to the affected part by wetting it slightly with a sponge or soft cloth saturated with the solution.

The application of the medicine should be made at regular intervals of about twelve hours. The effect is such that the most inveterate cases have been cured by my composition within three months.

My remedy, as above composed, is the result of much practice and many experiments, and has proven efficient in several instances in which it has been used.

Having fully described my new composition for the cure of cancers, &c.,

What I claim, and desire to secure by Letters Patent, is—

The several articles, put in solution, in the manner and substantially as specified, for the purpose described.

In testimony whereof, I have hereunto set my hand, this 15th day of September, 1869.

MORTIMER WILLIAMS.

Witnesses:
  H. P. K. PECK,
  A. L. PECK.